(12) United States Patent
Hotta et al.

(10) Patent No.: US 8,811,050 B2
(45) Date of Patent: Aug. 19, 2014

(54) INVERTER DEVICE RELAY-CONNECTING MEMBER

(75) Inventors: Yutaka Hotta, Chiryu (JP); Shiro Nishida, Toyota (JP); Yuki Higashimori, Toyota (JP)

(73) Assignees: Toyota Jidosha Kabushiki Kaisha, Aichi-ken (JP); Sumitomo Electric Industries, Ltd., Osaka (JP); Kohshin Electric Corp., Okayama-ken (JP); Autonetworks Technologies, Ltd., Mie-ken (JP); Sumitomo Wiring Sytems, Ltd, Mie-ken (JP)

( * ) Notice: Subject to any disclaimer, the term of this patent is extended or adjusted under 35 U.S.C. 154(b) by 342 days.

(21) Appl. No.: 13/320,890

(22) PCT Filed: Jun. 8, 2010

(86) PCT No.: PCT/JP2010/059693
 § 371 (c)(1),
 (2), (4) Date: Nov. 16, 2011

(87) PCT Pub. No.: WO2011/004671
 PCT Pub. Date: Jan. 13, 2011

(65) Prior Publication Data
 US 2012/0063188 A1 Mar. 15, 2012

(30) Foreign Application Priority Data
 Jul. 6, 2009 (JP) ................................ 2009-159518

(51) Int. Cl.
 *H02M 7/537* (2006.01)
(52) U.S. Cl.
 USPC ......................................... 363/144; 361/676

(58) Field of Classification Search
 USPC .......... 363/131, 132, 141, 144; 361/676, 677, 361/707; 180/54.1
 See application file for complete search history.

(56) References Cited

U.S. PATENT DOCUMENTS

| 4,597,025 | A | 6/1986 | Rutchik et al. |
| 5,831,425 | A | 11/1998 | Ochiai |
| 6,493,249 | B2* | 12/2002 | Shirakawa et al. ............ 363/147 |
| 6,978,856 | B2* | 12/2005 | Nakamura et al. ............ 180/68.4 |

(Continued)

FOREIGN PATENT DOCUMENTS

| CN | 101179162 A | 5/2008 |
| JP | 9047034 A | 2/1997 |

(Continued)

OTHER PUBLICATIONS

European Search Report dated Feb. 28, 2012, issued in corresponding European Patent Application No. 10796982.6-1231.

(Continued)

*Primary Examiner* — Adolf Berhane
*Assistant Examiner* — Nusrat Quddus
(74) *Attorney, Agent, or Firm* — Sughrue Mion, PLLC

(57) ABSTRACT

A relay-connecting member (16) has relay terminals (32), each of which is fit-connected to an output electrode (28) and a male tab (30) of an output terminal (14). With this structure, by simply inserting the output electrode (28) and the male tab (30) of the output terminal (14) into the relay-connecting member (16), it is possible to easily electrically connect the output electrode (28) and the male tab (30) of the output terminal (14) through the relay terminal (32).

8 Claims, 5 Drawing Sheets

(56) References Cited

U.S. PATENT DOCUMENTS

| | | | |
|---|---|---|---|
| 7,187,568 B2* | 3/2007 | Radosevich et al. | 363/144 |
| 7,692,525 B1* | 4/2010 | Halpin et al. | 336/96 |
| 2001/0014029 A1* | 8/2001 | Suzuki et al. | 363/141 |
| 2004/0222515 A1* | 11/2004 | Choi et al. | 257/706 |
| 2005/0006963 A1* | 1/2005 | Takenaka et al. | 310/52 |
| 2005/0270745 A1* | 12/2005 | Chen et al. | 361/707 |
| 2006/0050468 A1* | 3/2006 | Inoue et al. | 361/328 |
| 2006/0052914 A1 | 3/2006 | Kubokawa et al. | |
| 2008/0105476 A1 | 5/2008 | Korich et al. | |
| 2010/0050740 A1* | 3/2010 | Matsubara et al. | 73/23.31 |
| 2010/0256499 A1* | 10/2010 | Imahashi | 600/459 |
| 2013/0059452 A1* | 3/2013 | Nakamura | 439/59 |

FOREIGN PATENT DOCUMENTS

| | | | |
|---|---|---|---|
| JP | 9-093771 A | | 4/1997 |
| JP | 10-097879 A | | 4/1998 |
| JP | 10225140 A | | 8/1998 |
| JP | 11121067 A | | 4/1999 |
| JP | 2003-259656 | * | 2/2002 |
| JP | 2003167009 A | | 6/2003 |
| JP | 2006-081311 A | | 3/2006 |
| JP | 2006-092776 A | | 4/2006 |
| JP | 2006-194650 A | | 7/2006 |
| JP | 2007-259596 A | | 10/2007 |
| JP | 2008-114839 A | | 5/2008 |
| JP | 2008-131698 A | | 6/2008 |
| JP | 2009-070656 A | | 4/2009 |
| JP | 2009-140705 A | | 6/2009 |

OTHER PUBLICATIONS

Japanese Office Action dated Nov. 30, 2011, issued in corresponding Japanese Patent Application No. 2009-159518.

* cited by examiner

INVERTER DEVICE RELAY-CONNECTING MEMBER

CROSS REFERENCE TO RELATED APPLICATIONS

This application is a National Stage of International Application No. PCT/JP2010/059693 filed Jun. 8, 2010, claiming priority based on Japanese Patent Application No. 2009-159518 filed Jul. 6, 2009, the contents of all of which are incorporated herein by reference in their entirety.

TECHNICAL FIELD

The present invention relates to an improvement in an inverter device relay-connecting member which is accommodated in an inverter device including a circuit provided with a switching element, and which electrically connects the circuit and an output terminal of the inverter device.

BACKGROUND ART

Inverter devices for controlling power to be supplied to an electric motor have heretofore been known. Such an inverter device includes an intelligent power module (IPM) including a semiconductor chip serving as a switching element such as an IGBT (Insulated Gate Bipolar Transistor), an inverter circuit board on which the semiconductor chip is mounted, and a control board for controlling driving of the semiconductor chip.

The intelligent power module is provided with an output electrode which outputs power of the circuit board. The inverter device is provided with an output terminal which outputs its power to an electric motor. There are examples in which the output electrode and the output terminal are electrically connected through a bus bar serving as a relay-connecting member. Specifically, one end of the bus bar is fastened to the output electrode (for example, a bus bar) by means of a bolt, and another end of the bus bar is fastened to the output terminal (for example, a bus bar) by means of a bolt so that the output electrode and the output terminal are electrically connected.

Further, there are examples in which the relay-connecting member is provided with a current detector which detects a current that flows therethrough. The current detector includes a core through which the bus bar is passed, a magnetic flux density detection element such as a Hall element which is arranged in a gap portion of the core, and a circuit board on which the magnetic flux density detection element is mounted. In this current detector, when a current flows through the bus bar, the current causes generation of a magnetic field within the core, and the magnetic flux density detection element converts the intensity of that magnetic field into a voltage signal to thereby allow detection of a current value.

JP 2006-194650 A describes a current sensor which is accommodated in a power converter, and which detects a current of a bus bar that connects a semiconductor module and an output terminal block. The current sensor has a case which is formed of a resin such that the bus bar and a core through which the bus bar is passed form an integral structure, and a Hall element and a circuit board are attached to this case.

PRIOR ART DOCUMENTS

Patent Documents

Patent Document 1: JP 2006-194650 A

DISCLOSURE OF THE INVENTION

Problems to be Solved by the Invention

For a conventional inverter device, a bus bar serving as a relay-connecting member is connected to an output electrode of an inverter circuit and to an output terminal of an inverter device, respectively, by bolt fastening. Therefore, there is a problem in that, when a plurality of (for example, three, for three-phase alternating current power) relay-connecting members are to be attached, the fastening process is time-consuming.

Further, for a conventional inverter device, it is necessary to provide an interval determined in consideration of space for tools used for bolt fastening between adjacently arranged relay-connecting members. Therefore, there is a problem in that a large space is required for accommodating relay-connecting members in the inverter device.

Further, for a conventional inverter device, in order that a bus bar serving as a relay-connecting member can reliably pass through a core of a current detector when the relay-connecting member is attached, it is necessary to form a pass-through portion of the core to have a size with a sufficient margin with respect to the bus bar. Therefore, as the size of the core is large, there is a problem in that a large space is required for accommodating the core in the inverter device.

Further, for a conventional inverter device, a bus bar serving as a relay-connecting member must have a region for bolt fastening and a region in which a core is attached so as not to overlap with the region for bolt fastening. Therefore, as the size of the bus bar is large in the length direction, there is a problem in that a large space is required for accommodating the bus bar in the inverter device.

An object of the present invention is to provide an inverter device relay-connecting member in which an electrical connection between an output electrode of an inverter circuit and an output terminal of an inverter device can be achieved with a simple structure.

Further, an object of the present invention is to provide an inverter device relay-connecting member which can adapt to reduction in size of an inverter device.

Means for Solving the Problems

According to one aspect of the present invention, there is provided an inverter device relay-connecting member which is accommodated in an inverter device including a circuit provided with a switching element, and which electrically connects the circuit and an output terminal of the inverter device, the inverter device relay-connecting member comprising a relay terminal which is fit-connected to an output electrode of the circuit and a male tab of the output terminal; and a housing for accommodating the relay terminal, the housing being formed of a resin to form an integral structure having therein a current detector for detecting a current of the relay terminal.

Further, the relay terminal may have contact portions which are able to come into contact with the male tab even if the male tab that is inserted is displaced from a normal position in an axial direction, and which are able to come into contact with the male tab even if the male tab that is inserted is displaced from the normal position in a first orthogonal direction that is orthogonal to the axial direction.

Further, the contact portions may be supported by a pair of elastic support pieces which have an interval from each other in the first orthogonal direction, and which are displaceable in the first orthogonal direction, and the contact portions may come into contact with side surfaces of the male tab that is inserted.

Further, it is preferable that the contact portions are further able to come into contact with the male tab even if the male tab that is inserted is displaced from the normal position in a second orthogonal direction that is orthogonal to the axial direction and the first orthogonal direction.

Further, it is preferable that the length of the contact portions in the second orthogonal direction is greater than the length of the male tab in the same direction.

Further, the current detector may include a core through which the relay terminal is passed; a magnetic flux density detection element arranged in a gap portion of the core; and a circuit board on which the magnetic flux density detection element is mounted.

Advantages of the Invention

By employing the inverter device relay-connecting member according to the present invention, an electrical connection between an output electrode of an inverter circuit and an output terminal of an inverter device can be achieved with a simple structure. Further, by employing the inverter device relay-connecting member according to the present invention, an inverter device can be reduced in size.

REFERENCE NUMERALS

10 Inverter Device
12 Intelligent Power Module
14 Output Terminal
16 Relay-Connecting Member
18 Case
20 Semiconductor Chip
22 Inverter Circuit Board
24 Heatsink
26 Wire
28 Output Electrode
30 Male Tab
32 Relay Terminal
34 Housing
36 Current Detector
38 Core
39 Circuit Board
40 First Contact Portion
42 Second Contact Portion
44 Elastic Support Piece

EMBODIMENTS FOR CARRYING OUT THE INVENTION

Figure 1:
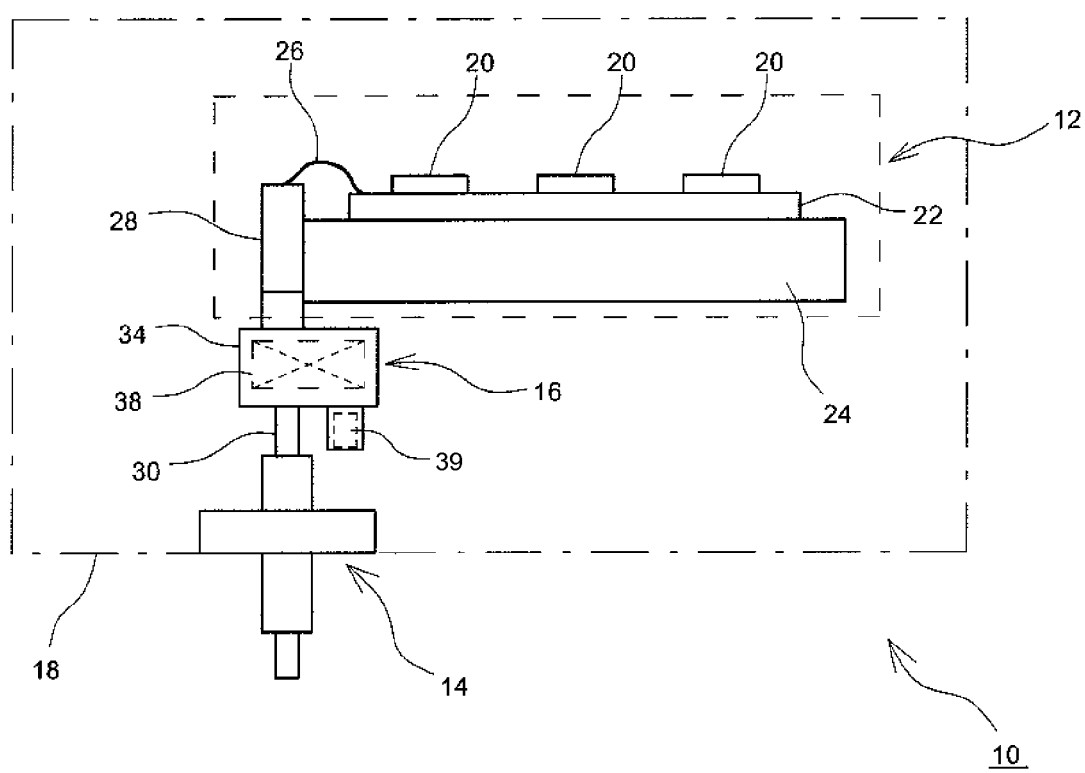
FIG. 1 shows a structure of an inverter device according to an embodiment of the present invention.
Figure 2:
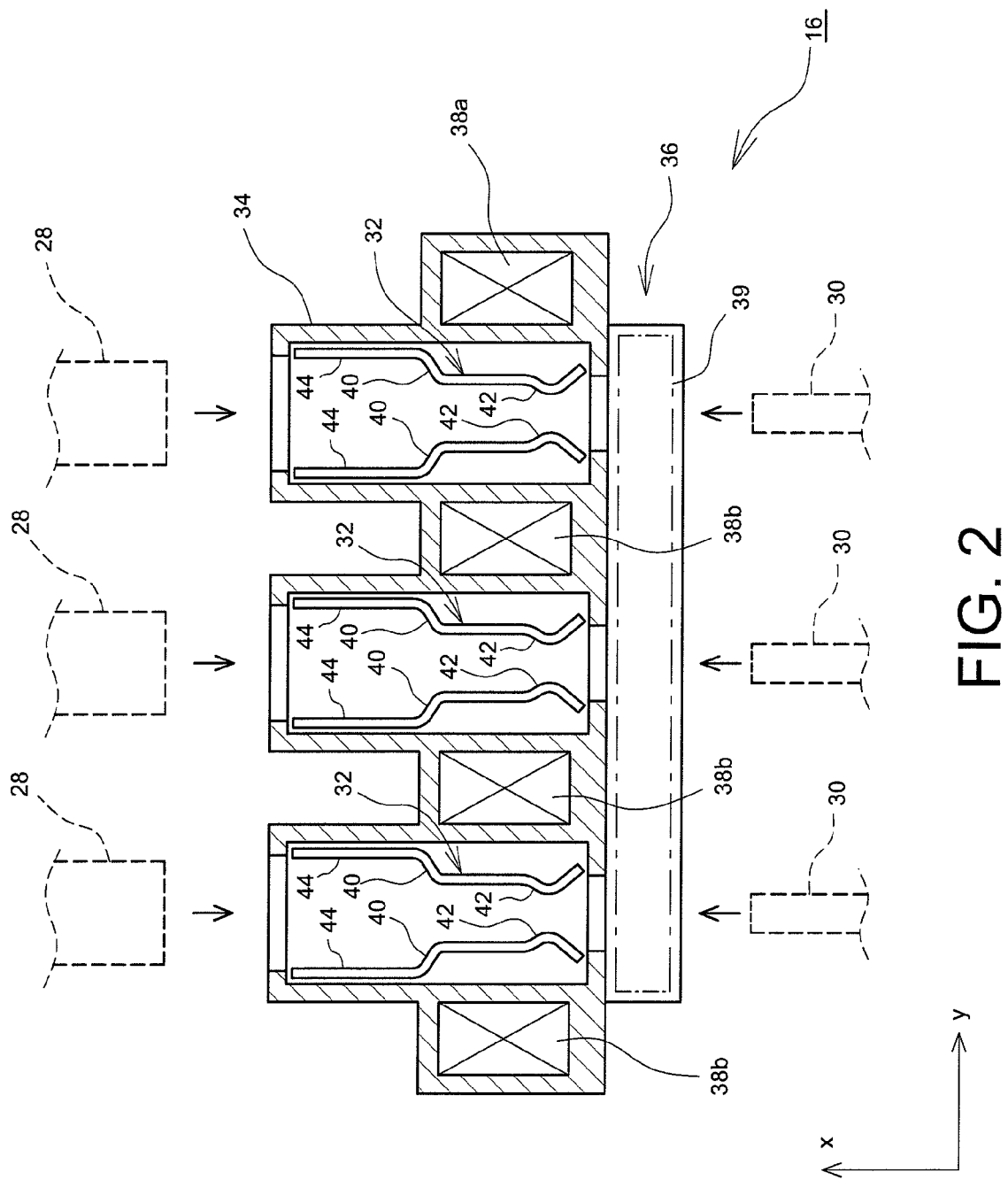
FIG. 2 shows a structure of a relay-connecting member according to the embodiment of the present invention.

An embodiment of an inverter device relay-connecting member according to the present invention will be described below with reference to the drawings. First, a structure of an inverter device will be described with reference to FIG. 1.

An inverter device 10 includes an intelligent power module 12 (indicated by a broken line in FIG. 1), an output terminal 14, and a relay-connecting member 16 which electrically connects the intelligent power module 12 and the output terminal 14. The intelligent power module 12 and the relay-connecting member 16 are housed in a case 18 (indicated by alternate long and short dashed lines in FIG. 1) of the inverter device 10, and the output terminal 14 is provided on the case 18 of the inverter device 10.

The intelligent power module 12 includes semiconductor chips 20 serving as switching elements, an inverter circuit board 22 on the front side of which the semiconductor chips 20 are mounted, a heatsink 24 provided on the back side of the inverter circuit board 22 for dissipating heat generated from the semiconductor chips 20, and a control board (not shown) for controlling driving of the semiconductor chips 20.

The semiconductor chips 20 are switching elements used for an inverter or a booster converter, and include an IGBT, a power transistor, a thyristor, and the like.

An electrical circuit is formed on the front side of the inverter circuit board 22, and the semiconductor chips 20 are electrically connected on this electrical circuit by means of soldering.

The heatsink 24 is formed of aluminum or copper, which are superior in thermal conductivity and have light weight. The heatsink 24 has a channel (not shown) through which a coolant flows. Further, an electronic device (not shown) may be provided in contact with the bottom plate of the heatsink 24. Examples of the electronic device include a DC/DC converter and a reactor, and heat generated from this electronic device can also be dissipated by the heatsink 24.

Further, the intelligent power module 12 has an output electrode 28 which outputs power from the semiconductor chips 20 through a wire 26. The output electrode 28 according to the present embodiment is a flat-shaped bus bar. This bus bar is electrically connected to the relay-connecting member 16. However, the output electrode 28 is not limited to a flat-shaped bus bar, but may also be a pin-shaped conductor component.

The output terminal 14 is connected to an electric motor (not shown), and power output from the intelligent power module 12 is output to the electric motor. The electric motor is a motor which is driven to rotate with supply thereto of three-phase alternating current power obtained by conversion from direct current power performed in the inverter device 10. The output terminal 14 according to the present embodiment has a pin-shaped male tab 30. The male tab 30 is electrically connected to the relay-connecting member 16. However, the shape of the male tab 30 is not limited to a pin shape, and may also be a flat shape.

Next, a structure of the relay-connecting member 16 according to the present embodiment will be described with reference to FIGS. 2 to 6. As an example, a relay-connecting member 16 having three electric lines for three-phase alternating current power will be described. However, the number of electric lines is given as one example, and the present invention is not limited to the number, three, of electric lines, but may also be applied to a relay terminal component having six electric lines, which integrates two sets of electric lines for three-phase alternating current power.

The relay-connecting member 16 has three relay terminals 32, each of which is fit-connected to the output electrode 28 and the male tab 30 of the output terminal 14. With this structure, by simply inserting the output electrode 28 and the male tab 30 of the output terminal 14 into the relay-connecting member 16, it is possible to easily electrically connect the output electrode 28 and the male tab 30 of the output terminal 14 through the relay terminal 32. Because bolt fastening is not performed, it is unnecessary to arrange the relay terminals 32 with an interval determined in consideration of space for tools used for bolt fastening being provided therebetween. Therefore, it is possible to arrange the relay terminals 32 with a smaller interval being provided therebetween, and it is possible to reduce the size of the relay-connecting member 16. Further, because bolt fastening is not performed, it is unnecessary to separate a region for bolt fastening and a region in which a core is attached in a relay-connecting member, as described above in connection with conventional techniques. In other words, by employing the relay-connecting member 16 according to the present embodiment, it is possible to attach a core so as to overlap with a region in which a relay terminal 32 is fit-connected to an output electrode 28 and a male tab 30. As such, it is possible to shorten the length of the relay-connecting member 16 in the axial direction, and it is possible to reduce the size of the relay-connecting member 16.

Further, the relay-connecting member 16 has a housing 34 for accommodating the relay terminals 32 in a manner such that the relay terminals 32 arranged with a predetermined interval being provided therebetween are isolated from each other. The housing 34 is formed of a resin to form an integral structure having therein a current detector 36 for detecting a current that flows through the relay terminals 32.

The current detector 36 includes cores 38a and 38b which are provided such that relay terminals 32 located on the respective ends pass through the cores 38a and 38b, magnetic flux density detection elements (not shown) which are arranged in gap portions (not shown) of the cores 38a and 38b, and a circuit board 39 on which these magnetic flux density detection elements are mounted. In the current detector 36, when a current flows through the relay terminals 32, the current causes a magnetic field to be generated within the cores 38a and 38b, and the magnetic flux density detection elements convert the intensity of that magnetic field into a voltage signal so that the current detector 36 detects a current value. The current value is output from the current detector 36 to the control board of the intelligent power module 12, and the control board controls driving of the semiconductor chip 20 based on the current value.

As the current detector 36 is formed of a resin integrally with the housing 34, when the relay-connecting member 16 is to be attached, the process of passing the relay terminals 32 through the respective cores 38a and 38b is eliminated. This eliminates the necessity to form pass-through portions of the cores 38a and 38b to have a large size beforehand as described above in connection with conventional techniques, and therefore, the cores 38a and 38b can be reduced in size to be smaller than conventional cores, and the relay-connecting member 16 can be reduced in size. Further, although a conventional current detector is supported by means of, for example, an attachment component for the intelligent power module, because the current detector 36 according to the present embodiment is attached integrally with the housing 34 of the relay-connecting member 16, it is possible to save space for the conventional attachment component.

Figure 3:
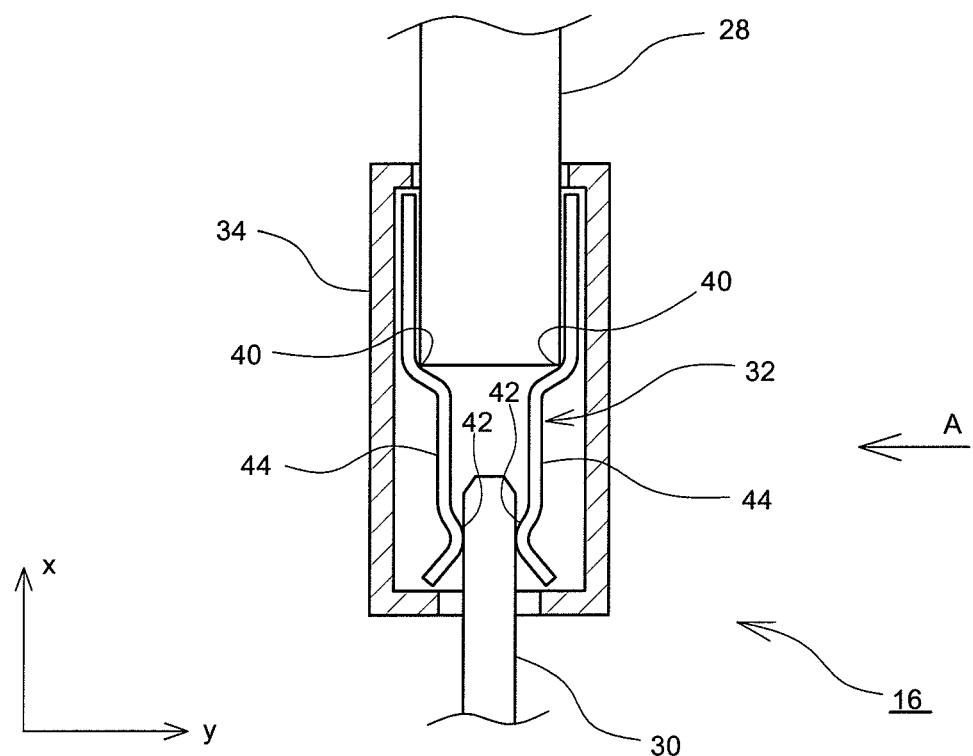
FIG. 3 shows a state in which the relay-connecting member is fit-connected to an output electrode and an output terminal.

FIG. 3 shows a state in which the relay-connecting member 16 is fit-connected to the output electrode 28 and the output terminal 14. This diagram and FIGS. 4 to 6, which will be described later, focus on one relay terminal 32 of the relay-connecting member 16, and show a state in which this relay terminal 32 is connected to the output electrode 28 and the male tab 30 of the output terminal 14.

The relay terminal 32 has first contact portions 40 which come into contact with the output electrode 28 inserted into the relay-connecting member 16, and second contact portions 42 which come into contact with the male tab 30 inserted into the relay-connecting member 16. The first contact portions 40 and the second contact portions 42 are supported by elastic support pieces 44. The first contact portions 40 are supported by the elastic support pieces 44 so as to come into contact with an end surface of the output electrode 28. The first contact portions 40 come into contact with the end surface of the output electrode 28 so as to restrict the movement of the output electrode 28 toward the inner side of the relay terminal 32 in the axial direction; in other words, in the x direction. On the other hand, the second contact portions 42 are supported by the elastic support pieces 44 so as to come into contact with side surfaces of the male tab 30. As the second contact portions 42 come into contact with the side surfaces of the male tab 30, the second contact portions 42 do not restrict the movement of the male tab 30 toward the inner side of the relay terminal 32 in the axial direction; in other words, in the x direction. The elastic support pieces 44 and the first and second contact portions 40 and 42 according to the present embodiment are integrally formed.

The elastic support pieces 44 are formed to extend in the x direction, and are provided to oppose each other with an interval being provided therebetween in the y direction that is orthogonal to the x direction (shown in FIG. 3). In other words, the first contact portions 40 and the second contact portions 42 are respectively provided to oppose each other with an interval being provided therebetween in the y direction. The elastic support pieces 44 are plate-shaped elastic components which can tilt within the housing 34 in the y direction, and are attached to the housing 34 only at an end portion on the side from which the output electrode 28 is inserted. As a result, portions of the elastic support pieces 44 on the side from which the male tab 30 is inserted are displaceable in the y direction. In other words, the second contact portions 42 are displaceable in the y direction.

Figure 4:
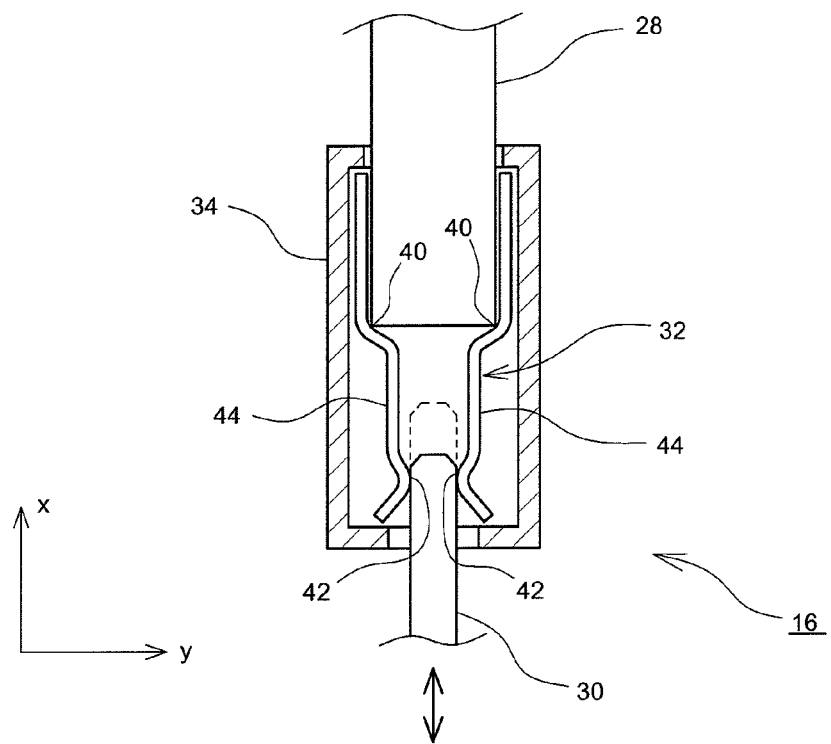
FIG. 4 shows a state for a case where a male tab of the output terminal is displaced from a normal position in the x direction.
Figure 5:
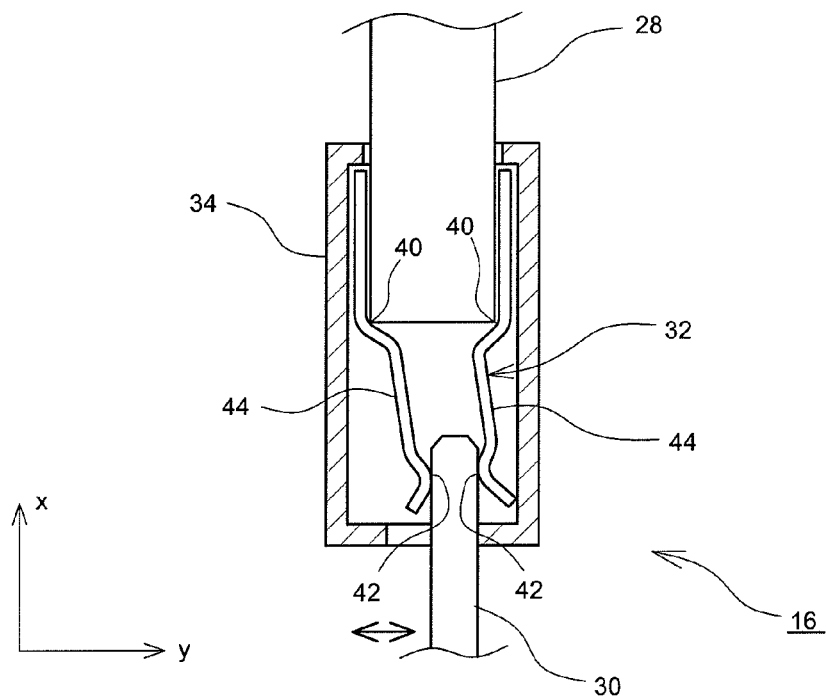
FIG. 5 shows a state for a case where the male tab of the output terminal is displaced from the normal position in the y direction.

With this structure, as shown in FIG. 4, even if the inserted male tab 30 is displaced from the normal position in the x direction, the second contact portions 42 can come into contact with the male tab 30. Further, as shown in FIG. 5, even if the inserted male tab 30 is displaced from the normal position in the y direction, the second contact portions 42 can come into contact with the male tab 30.

Figure 6:
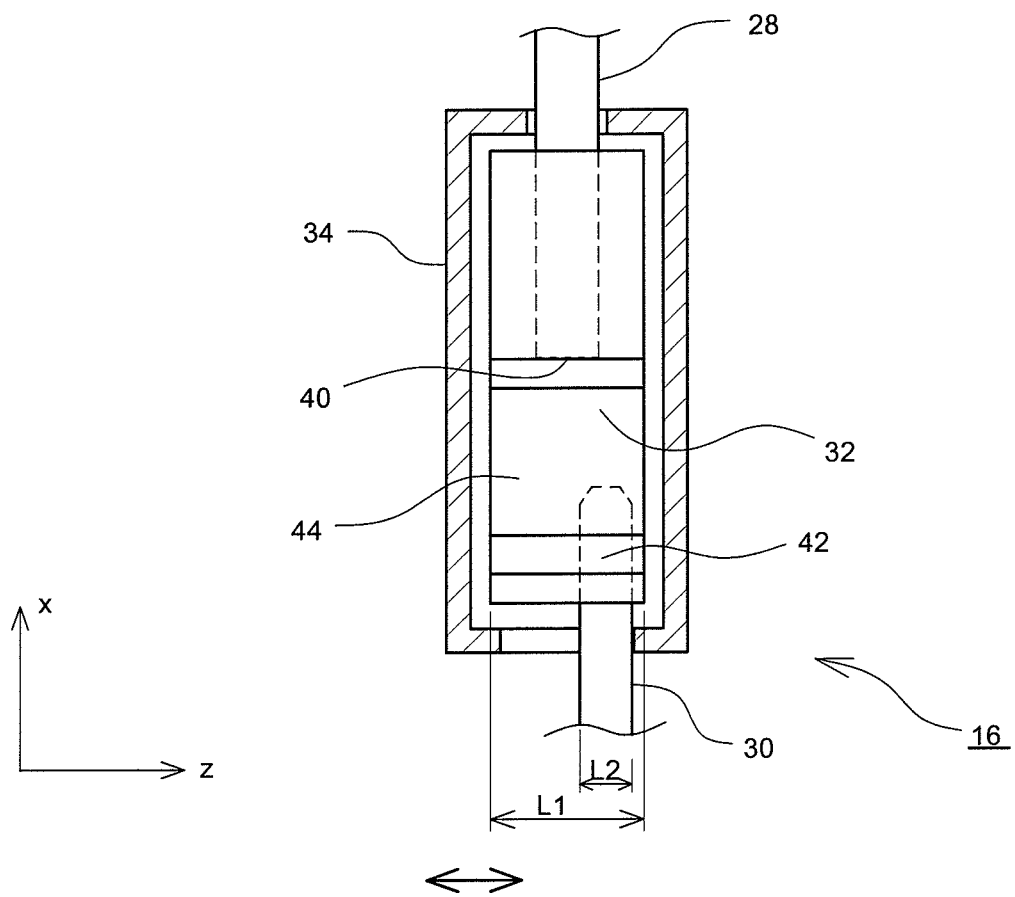
FIG. 6 shows a state for a case where the male tab of the output terminal is displaced from the normal position in the z direction.

FIG. 6 is a diagram corresponding to FIG. 3 as viewed from the direction of arrow A shown in FIG. 3. As shown in FIG. 6, a length L1 of the second contact portions 42 in the z direction that is orthogonal to the x direction and the y direction is greater than a length L2 of the male tab 30 in the z direction. As such, even if the inserted male tab 30 is displaced from the normal position in the z direction, the second contact portions 42 can come into contact with the male tab 30.

By employing the relay-connecting member 16 according to the present embodiment, even if a positional displacement occurs between the output electrode 28 and the output terminal 14 during assembly, the relay terminal 32 can permit that positional displacement to maintain an electrical connection between the output electrode 28 and the male tab 30.

Although, with reference to the above-described embodiment, there has been described a structure in which the second contact portions 42 are configured to be able to come into contact with the male tab 30 which is displaced in various directions, the present invention is not limited to this structure, and the first contact portions 40 may be configured in such a manner.

Although, with reference to the above-described embodiment, there has been described a structure in which the output terminal 14 is provided on the case 18 of the inverter device 10, the present invention is not limited to this structure, and the output terminal 14 may be provided on a case of an electric motor.

The invention claimed is:

1. An inverter device relay-connecting member which is accommodated in an inverter device including a circuit provided with a switching element, and which electrically connects the circuit and an output terminal of the inverter device, the inverter device relay-connecting member comprising:
   a relay terminal to which an output electrode of the circuit and a male tab of the output terminal are respectively inserted to be fit connected; and
   a housing for accommodating the relay terminal in a space formed therein, the housing being formed of a resin to form an integral structure having therein a current detector for detecting a current of the relay terminal; and
   wherein the relay terminal is structured, on a side to which the male tab is inserted, to be displaceable in a first orthogonal direction that is orthogonal to an axial direction in the space formed inside the housing such that the relay terminal comes into contact with the male tab even if the male tab that is inserted is displaced from a normal position in the first orthogonal direction.

2. An inverter device relay-connecting member which is accommodated in an inverter device including a circuit provided with a switching element, and which electrically connects the circuit and an output terminal of the inverter device, the inverter device relay-connecting member comprising:
   a relay terminal to which an output electrode of the circuit and a male tab of the output terminal are respectively inserted to be fit connected; and
   a housing for accommodating the relay terminal in a space formed therein, the housing being formed of resin to form an integral structure having therein a current detector for detecting a current of the relay terminal,
   wherein the relay terminal has contact portions which are able to come into contact with the male tab even if the male tab that is inserted is displaced from a normal position in an axial direction, and which are able to come into contact with the male tab even if the male tab that is inserted is displaced from the normal position in a first orthogonal direction that is orthogonal to the axial direction.

3. The inverter device relay-connecting member according to claim 2, wherein
   the contact portions are supported by a pair of elastic support pieces which have an interval from each other in the first orthogonal direction, and which are displaceable in the first orthogonal direction, and
   the contact portions come into contact with side surfaces of the male tab that is inserted.

4. The inverter device relay-connecting member according to claim 3, wherein
   the contact portions are further able to come into contact with the male tab even if the male tab that is inserted is displaced from the normal position in a second orthogonal direction that is orthogonal to the axial direction and the first orthogonal direction.

5. The inverter device relay-connecting member according to claim 4, wherein
   a length of the contact portions in the second orthogonal direction is greater than a length of the male tab in the same direction.

6. An inverter device relay-connecting member which is accommodated in an inverter device including a circuit provided with a switching element, and which electrically connects the circuit and an output terminal of the inverter device, the inverter device relay-connecting member comprising:
   a relay terminal to which an output electrode of the circuit and a male tab of the output terminal are respectively inserted to be fit connected; and
   a housing for accommodating the relay terminal in a space formed therein, the housing being formed of resin to form an integral structure having therein a current detector for detecting a current of the relay terminal,
   wherein the current detector includes:
   a core through which the relay terminal is passed;
   a magnetic flux density detection element arranged in a gap portion of the core; and
   a circuit board on which the magnetic flux density detection element is mounted.

7. The inverter device relay-connecting member according to claim 2, wherein the relay terminal is structured, on a side to which the male tab is inserted, to be displaceable in a first orthogonal direction that is orthogonal to an axial direction in the space formed inside the housing such that the relay terminal comes into contact with the male tab even if the male tab that is inserted is displaced from a normal position in the first orthogonal direction.

8. The inverter device relay-connecting member according to claim 6, wherein the relay terminal is structured, on a side to which the male tab is inserted, to be displaceable in a first orthogonal direction that is orthogonal to an axial direction in the space formed inside the housing such that the relay terminal comes into contact with the male tab even if the male tab that is inserted is displaced from a normal position in the first orthogonal direction,
   the contact portions are further able to come into contact with the male tab even if the male tab that is inserted is displaced from the normal position in a second orthogonal direction that is orthogonal to the axial direction and the first orthogonal direction.

* * * * *